US012665333B2

(12) United States Patent
Lee

(10) Patent No.: US 12,665,333 B2
(45) Date of Patent: Jun. 23, 2026

(54) ELECTRICAL OUTLET HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 268 days.

(21) Appl. No.: 18/224,324

(22) Filed: Jul. 20, 2023

(65) Prior Publication Data

US 2024/0275097 A1 Aug. 15, 2024

(30) Foreign Application Priority Data

Feb. 13, 2023 (KR) ........................ 10-2023-0018570

(51) Int. Cl.
*H01R 13/10* (2006.01)

(52) U.S. Cl.
CPC .................................... *H01R 13/10* (2013.01)

(58) Field of Classification Search
CPC ...................................................... H01R 13/10
USPC .......................................................... 439/884
See application file for complete search history.

(56) References Cited

FOREIGN PATENT DOCUMENTS

| | | | | |
|---|---|---|---|---|
| KR | 10-2005-0037986 A | | 4/2005 | |
| KR | 10-1625493 B1 | | 5/2016 | |
| KR | 10-2016-0149610 A | | 12/2016 | |
| WO | WO-2023277249 A1 | * | 1/2023 | ............. H01R 25/00 |

OTHER PUBLICATIONS

KR20050037986 machine generated translation, Choi Seung Jin, Anti-Electric Shock System in Water Immersion, Apr. 25, 2005 (Year: 2005).*

KR20160149610 machine generated translation, Jung Seoung Eun, Socket Having a Function of Electric Leakage Prevention, Dec. 28, 2016 (Year: 2016).*

KR-102350771-B1 machine translation (year 2022).*

Non-final Office Action mailed on Jun. 17, 2024 from the Korean Patent Office for Korean Application No. 10-2023-0018570.

Final Office Action mailed on Jan. 9, 2025 from the Korean Patent Office for Korean Application No. 10-2023-0018570.

* cited by examiner

*Primary Examiner* — Tulsidas C Patel
*Assistant Examiner* — Jeffrey Mountain

(57) ABSTRACT

The present disclosure relates to an electrical outlet having a leakage current limiting function, in which a current leaked from a phase voltage line (R line or T line or S line) terminal of the electrical outlet may be limited by expanding an area of a neutral line (N line) terminal of an electrical outlet into which a plug of an electronic device is inserted and coupled, so that the risk of electric shock to the human body due to a leakage current can be minimized.

3 Claims, 5 Drawing Sheets

ELECTRICAL OUTLET HAVING LEAKAGE CURRENT LIMITING FUNCTION

CROSS-REFERENCE TO RELATED APPLICATION

This application claims priority to and the benefit of Korean Patent Application No. 10-2023-0018570 filed on Feb. 13, 2023, the disclosure of which is incorporated herein by reference in its entirety.

BACKGROUND

1. Field of the Invention

The present disclosure relates to an electrical outlet into which a plug of an electronic device is inserted and coupled, and more particularly, to an electrical outlet having a leakage current limiting function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a current leaked from a phase voltage line (R line or T line or S line) terminal of an electrical outlet by expanding an area of a neutral line (N line) terminal of the electrical outlet into which a plug of an electronic device is inserted and coupled.

RELATED ART DOCUMENT

[Patent Document]

Korean Patent Registration No. 10-1625493 (published on May 30, 2016)

SUMMARY OF THE INVENTION

The present disclosure is directed to providing an electrical outlet having a leakage current limiting function, which may limit a current leaked from a phase voltage line (R line or T line or S line) terminal of the electrical outlet by expanding an area of a neutral line (N line) terminal of the electrical outlet.

An electrical outlet having a leakage current limiting function includes a phase voltage line terminal to which a phase voltage line (R line or T line or S line) of a commercial alternating current (AC) power system is connected, a neutral line terminal to which a neutral line (N line) of the commercial AC power system is connected, a ground terminal to which a ground line (G line) is connected, and a neutral line terminal area expansion unit that is in electrical contact with the neutral line terminal to expand an area of the neutral line terminal so as to limit a leakage current.

The neutral line terminal area expansion unit may be implemented in the form of a metal body having an eccentric closed surface, which is inscribed with the neutral line terminal and spaced apart from the phase voltage line terminal.

The neutral line terminal area expansion unit may be implemented in the form of a metal body having an open surface, which is in contact with the neutral line terminal and is not in contact with the phase voltage line terminal.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
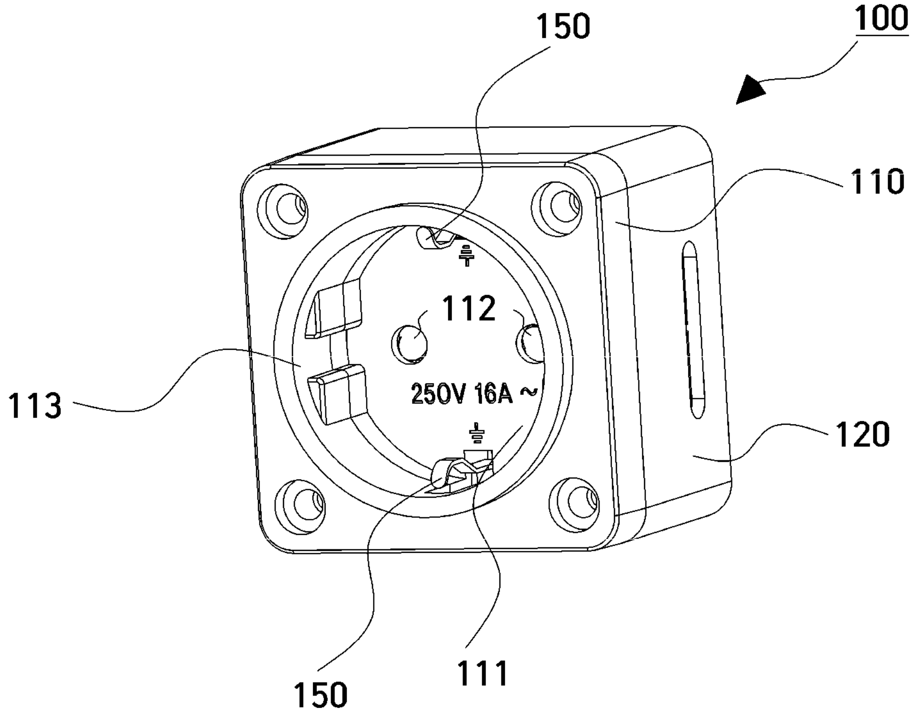
FIG. 1 is a perspective view illustrating an exterior of an electrical outlet having a leakage current limiting function according to an embodiment of the present disclosure.

Hereinafter, the present disclosure will be described in detail so that those skilled in the art may easily understand and reproduce the present disclosure through exemplary embodiments described with reference to the accompanying drawings.

Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

Figure 2:
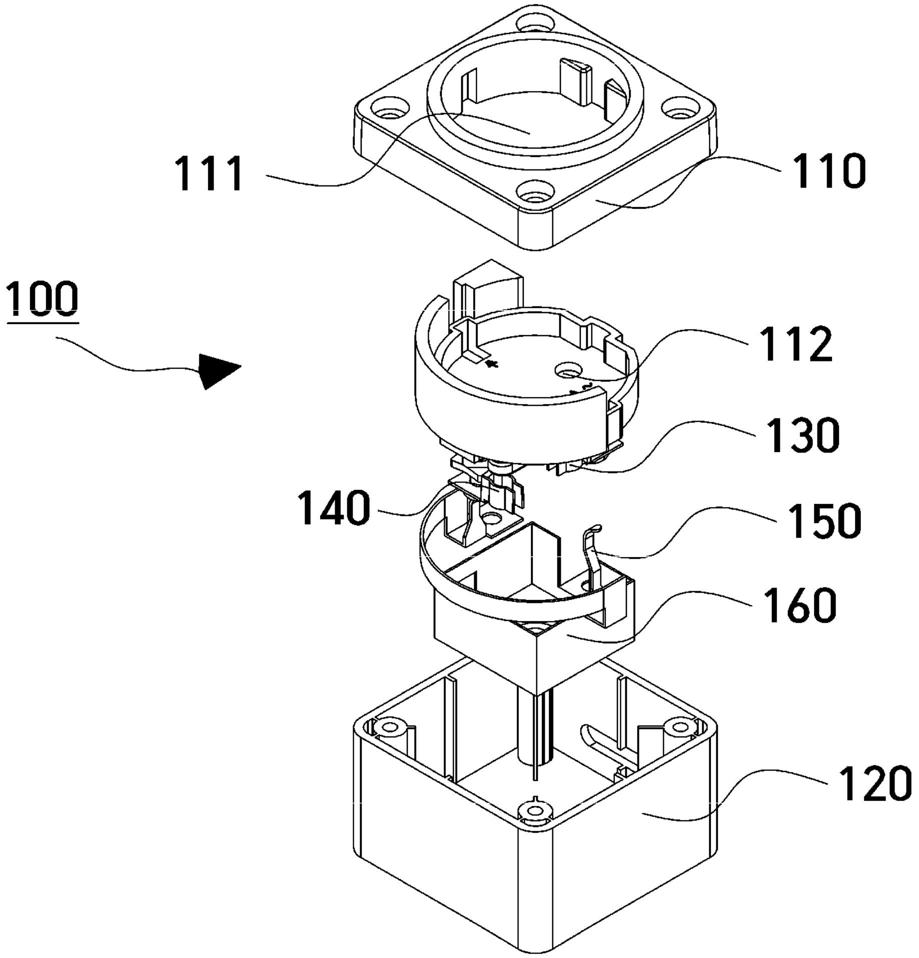
FIG. 2 is an exploded perspective view illustrating the electrical outlet having a leakage current limiting function according to the embodiment of the present disclosure.
Figure 3:
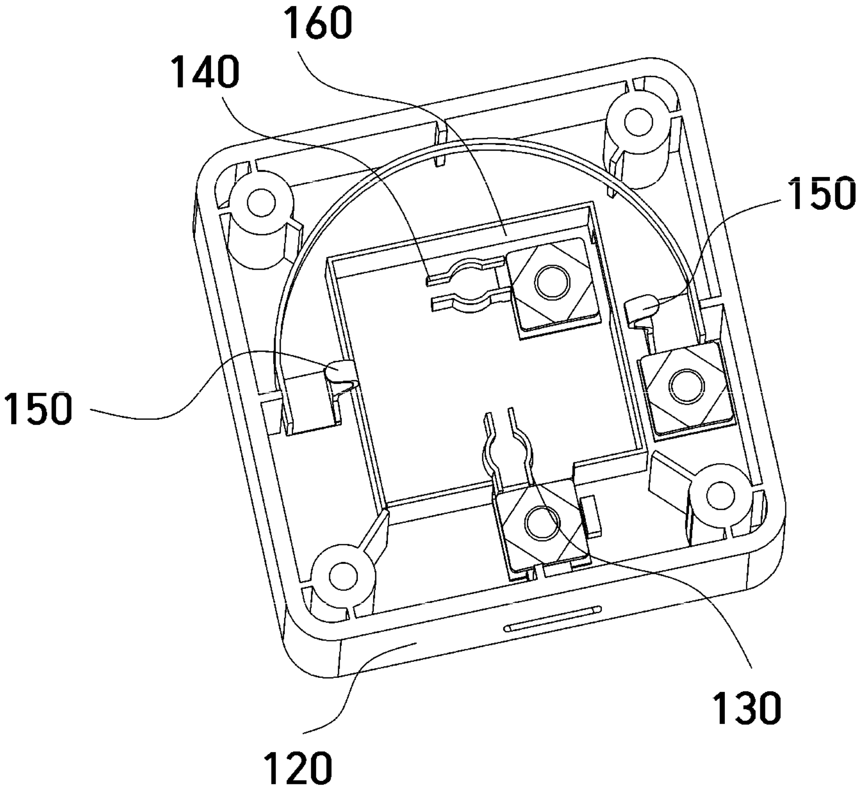
FIG. 3 is a view illustrating an internal structure of the electrical outlet having a leakage current limiting function according to the embodiment of the present disclosure.

FIG. 1 is a perspective view illustrating an exterior of an electrical outlet having a leakage current limiting function according to an embodiment of the present disclosure, FIG. 2 is an exploded perspective view illustrating the electrical outlet having a leakage current limiting function according to the embodiment of the present disclosure, and FIG. 3 is a view illustrating an internal structure of the electrical outlet having a leakage current limiting function according to the embodiment of the present disclosure.

As illustrated in FIGS. 1 to 3, in an electrical outlet 100 having a leakage current limiting function according to the embodiment, a phase voltage line terminal 130, a neutral line terminal 140, a ground terminal 150, and a neutral line terminal area expansion unit 160 that are made of a conductive material are mounted inside a front housing 110 and a rear housing 120 coupled to each other to protect an inside and made of an insulating material.

A plug coupling groove 111 into which a plug (not illustrated) of an electronic device is inserted and coupled is formed in a front surface of the front housing 110, and a plurality of plug pin insertion holes 112 into which a phase voltage line plug pin (not illustrated) and a neutral line plug pin (not illustrated) protruding from an end of the plug to the front are inserted are formed in a bottom surface of the plug coupling groove 111.

Meanwhile, a plug coupling guide part 113 that guides plug coupling so that the phase voltage line plug pin and the neutral line plug pin are easily inserted into the plug pin insertion holes 112 is formed in an inner circumference of the plug coupling groove 111, and thus the plug is coupled to the plug coupling groove 111 only in a specific rotational direction.

In a state in which the phase voltage line terminal 130, the neutral line terminal 140, the ground terminal 150, and the neutral line terminal area expansion unit 160 that are made of a conductive material are mounted inside the rear housing 120, the front housing 110 is coupled to a front surface of the rear housing 120.

The phase voltage line terminal 130 made of a conductive material is connected to a phase voltage line (R line or T line or S line) (not illustrated) of a commercial alternating current (AC) power system. Meanwhile, a phase voltage line plug pin protruding from the end of the plug to the front is connected to the phase voltage line terminal 130.

The neutral line terminal 140 made of a conductive material is connected to a neutral line (N line) (not illustrated) of the commercial AC power system.

Meanwhile, the neutral line plug pin protruding from the end of the plug to the front is connected to the neutral line terminal 140.

The ground terminal 150 made of a conductive material is connected to a ground line (G line) (not illustrated). Meanwhile, ground pins (not illustrated) formed on both sides of the end of the plug are connected to the ground terminal 150.

The neutral line terminal area expansion unit 160 made of a conductive material is in electrical contact with the neutral line terminal 140 to expand an area of the neutral line terminal 140 so as to limit a leakage current. The area of the neutral line terminal 140 becomes greater than the phase voltage line terminal 130 and the ground terminal 150 by the neutral line terminal area expansion unit 160, and thus the leakage current becomes very small. As the leakage current becomes smaller, the risk of electric shock deceases, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line terminal of the present disclosure) connected to a negative terminal becomes greater than an area of the flat plate-shaped conductor (corresponding to the phase voltage line terminal of the present disclosure) connected to a positive terminal of a power source.

In detail, a closed loop is not normally configured in a portion of the neutral line terminal 140 where an area is expanded by the neutral line terminal area expansion unit 160, but when the electrical outlet 100 having a leakage current limiting function is submerged in water due to flooding, the closed loop is configured.

When the electrical outlet 100 having a leakage current limiting function is flooded and submerged in water to form the closed loop, a current leaks through the phase voltage line terminal 130, and the current flows through the phase voltage line terminal 130, the water, the neutral line terminal area expansion unit 160, and the neutral line terminal 140 in this order.

In this process, the current leaked from the phase voltage line terminal 130 does not flow to the human body having a relatively very high resistance but flows to the neutral line terminal area expansion unit 160 through the water and is drawn in the neutral line (N line). Thus, the leakage current is prevented from flowing to the human body to minimize the risk of electric shock to the human body.

By this implementation, according to the present disclosure, a current leaked from the phase voltage line (R line or T line or S line) terminal of the electrical outlet may be limited by expanding the area of the neutral line (N line) terminal of the electrical outlet into which the plug of the electronic device is inserted and coupled. Thus, the risk of electric shock to the human body due to the leakage current can be minimized.

Meanwhile, according to an additional aspect of the present disclosure, the neutral line terminal area expansion unit 160 may be implemented in the form of a metal body having an eccentric closed surface, which is inscribed with the neutral line terminal 140 and spaced apart from the phase voltage line terminal 130.

Figure 4:
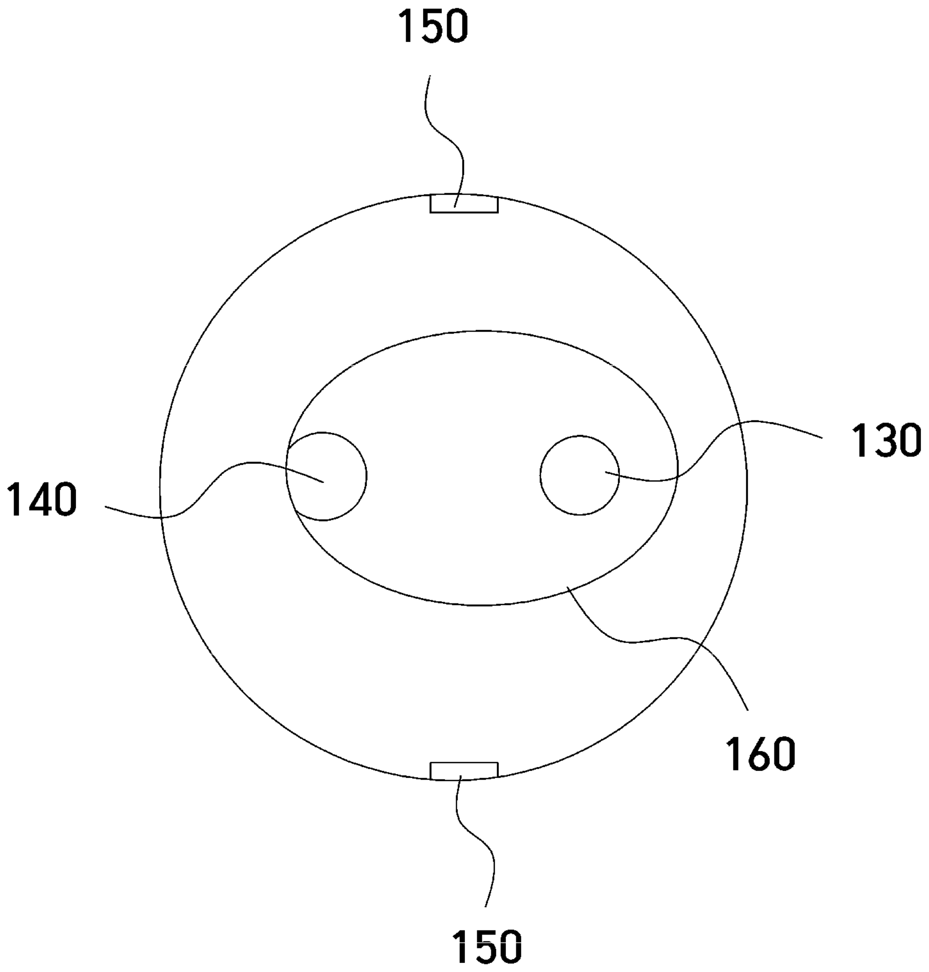
FIG. 4 is a view illustrating an example in which a neutral line terminal area expansion unit of the electrical outlet having a leakage current limiting function is implemented in a metal body shape having a closed surface according to the present disclosure.

FIG. 4 is a view illustrating an example in which a neutral line terminal area expansion unit of the electrical outlet having a leakage current limiting function is implemented in a metal body shape having a closed surface according to the present disclosure.

Referring to FIG. 4, it may be seen that the neutral line terminal area expansion unit 160 is implemented in the form of a metal body having an eccentric closed surface, which is inscribed with the neutral line terminal 140 and spaced apart from the phase voltage line terminal 130.

By this implementation, according to the present disclosure, a current leaked from the phase voltage line (R line or T line or S line) terminal of the electrical outlet may be limited by expanding the area of the neutral line (N line) terminal of the electrical outlet, into which the plug of the electronic device is inserted and coupled, through the neutral line terminal area expansion unit 160 in the form of a metal body having a closed surface. Thus, the risk of electric shock to the human body due to the leakage current can be minimized.

Meanwhile, according to an additional aspect of the present disclosure, the neutral line terminal area expansion unit 160 may be implemented in the form of a metal body having an open surface, which is in contact with the neutral line terminal 140 and not in contact with the phase voltage line terminal 130.

Figure 5:
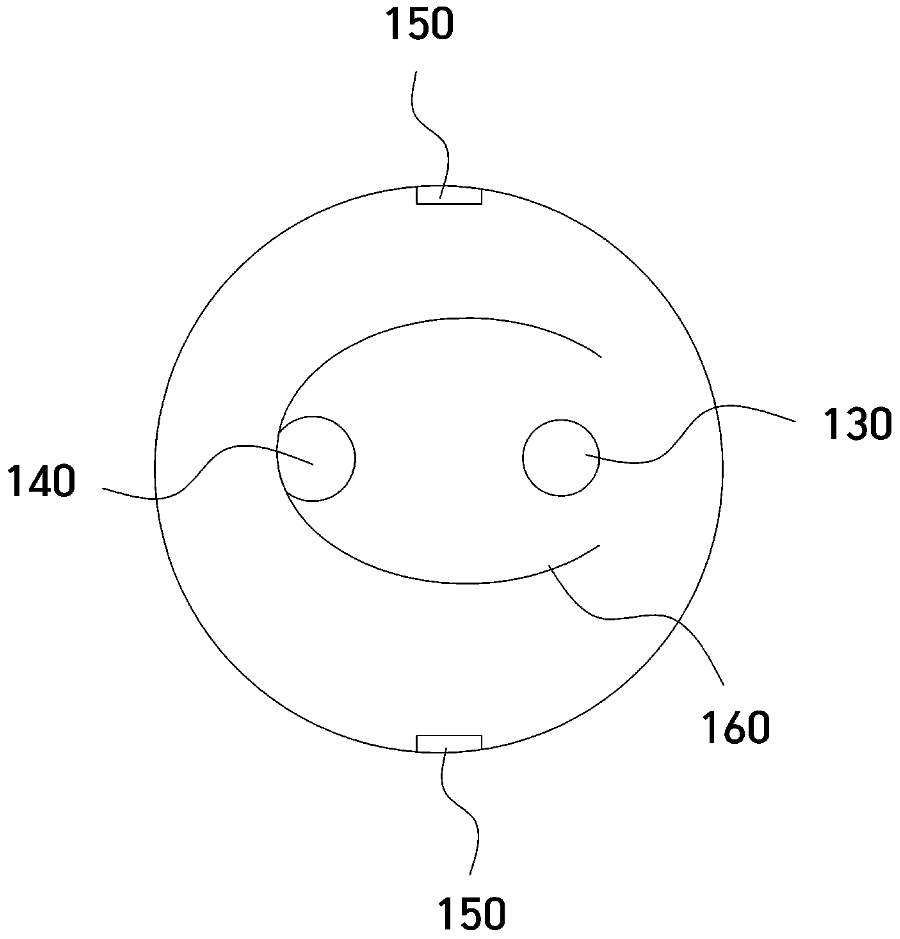
FIG. 5 is a view illustrating an example in which the neutral line terminal area expansion unit of the electrical outlet having a leakage current limiting function is implemented in a metal body shape having an open surface according to the present disclosure.

FIG. 5 is a view illustrating an example in which the neutral line terminal area expansion unit of the electrical outlet having a leakage current limiting function is implemented in a metal body shape having an open surface according to the present disclosure.

Referring to FIG. 5, it may be seen that the neutral line terminal area expansion unit 160 is implemented in the form of a metal body having an open surface, which is in contact with the neutral line terminal 140 and not in contact with the phase voltage line terminal 130.

By this implementation, according to the present disclosure, a current leaked from the phase voltage line (R line or T line or S line) terminal of the electrical outlet may be limited by expanding the area of the neutral line (N line) terminal of the electrical outlet, into which the plug of the electronic device is inserted and coupled, through the neutral line terminal area expansion unit 160 in the form of a metal body having an open surface. Thus, the risk of electric shock to the human body due to the leakage current can be minimized.

As described above, according to the present disclosure, a current leaked from the phase voltage line (R line or T line or S line) terminal of the electrical outlet may be limited by expanding the area of the neutral line (N line) terminal of the electrical outlet into which the plug of the electronic device is inserted and coupled. Thus, since the risk of electric shock to the human body due to the leakage current can be minimized, the purpose of the present disclosure presented above can be achieved.

According to the present disclosure, a current leaked from a phase voltage line (R line or T line or S line) terminal of an electrical outlet can be limited by expanding an area of a neutral line (N line) terminal of the electrical outlet into which a plug of an electronic device is inserted and coupled. Thus, the risk of electric shock to a human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. An electrical outlet having a leakage current limiting function, the electrical outlet comprising:

a phase voltage line terminal to which a phase voltage line (R line or T line or S line) of a commercial alternating current (AC) power system is connected;

a neutral line terminal to which a neutral line (N line) of the commercial AC power system is connected;

a ground terminal to which a ground line (G line) is connected; and a neutral line terminal area expansion unit that is in electrical contact with the neutral line terminal to expand an area of the neutral line terminal so as to limit a leakage current, wherein the neutral line terminal area expansion unit comprises a metal body formed as an elliptical loop.

2. The electrical outlet of claim 1, wherein the metal body is formed as a closed elliptical loop, and wherein the neutral line terminal and the phase voltage line terminal are positioned off-center relative to the closed elliptical loop such that the metal body contacts the neutral line terminal at one position, and the metal body does not contact the phase voltage line terminal.

3. The electrical outlet of claim 1, wherein the metal body is formed as a partially open elliptical loop, wherein the neutral line terminal and the phase voltage line terminal are positioned off-center relative to the partially open elliptical loop such that the metal body contacts the neutral line terminal at one position, and the metal body does not contact the phase voltage line terminal.

* * * * *